United States Patent [19]
Kim

[11] Patent Number: 5,731,908
[45] Date of Patent: Mar. 24, 1998

[54] PHOTOGRAPHIC LENS SYSTEM

[75] Inventor: Moon Hyun Kim, Kyeongsangnam-do, Rep. of Korea

[73] Assignee: Samsung Aerospace Industries, Ltd., Kyeongsangnam-do, Rep. of Korea

[21] Appl. No.: 759,717

[22] Filed: Dec. 6, 1996

[30] Foreign Application Priority Data

Dec. 8, 1995 [KR] Rep. of Korea ............... 95-47976

[51] Int. Cl.$^6$ ............................................. G02B 13/08
[52] U.S. Cl. ............................................. 359/668; 359/671
[58] Field of Search ............................... 359/668, 671

[56] References Cited

U.S. PATENT DOCUMENTS

| | | | |
|---|---|---|---|
| 3,511,557 | 5/1970 | Lindstedt et al. | 359/671 |
| 3,517,984 | 6/1970 | Lindstedt et al. | 359/671 |
| 3,658,410 | 4/1972 | Willey | 359/671 |

FOREIGN PATENT DOCUMENTS

| | | |
|---|---|---|
| 60-171055 | 9/1985 | Japan. |
| 62-0214219 | 9/1987 | Japan. |
| 62-217689 | 9/1987 | Japan. |

*Primary Examiner*—Scott J. Sugarman
*Attorney, Agent, or Firm*—Finnegan, Henderson, Farabow, Garrett & Dunner, L.L.P.

[57] ABSTRACT

A photographic lens system, comprising, from an object side, a first lens group having a positive refractive power, and a second lens group having a positive refractive power, wherein the first and the second lens groups comprise at least one cylindrical lens and the photographic lens system satisfies the condition of $1.0 < f_1/f_2 < 1.2$, where $f_1$ represents a focal length in the Y direction, and $f_2$ represents a focal length in the Z direction.

The photographic lens system enables an image to be formed at the same position by making the horizontal magnification different from the vertical magnification due to the back focal length in the Y direction being different from that in the Z direction while equating the focal point lengths in the Y and Z directions. The photographic lens system can be used in a high quality camera having a relatively large aperture ratio and a good image forming efficiency.

4 Claims, 3 Drawing Sheets

FIG.5(a) "PRIOR ART"
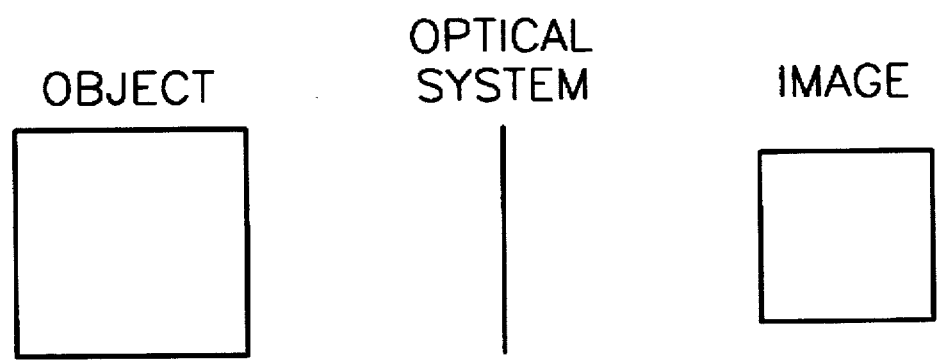
FIG.5(b)
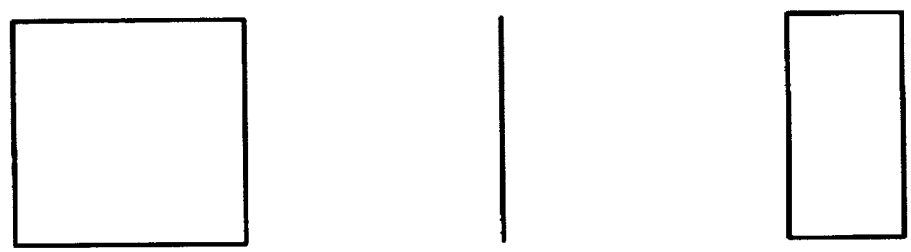

1

PHOTOGRAPHIC LENS SYSTEM

BACKGROUND OF THE INVENTION

1. Field of the Invention

The present invention relates to a photographic lens system, and more particularly, to a photographic lens system used in a single lens reflex camera to create a scaled-down image having a horizontal magnification different from a vertical magnification.

2. Description of the Related Art

The most widely-known optical system among the photographic systems used in the conventional single lens reflex cameras is a gauss-type standard lens. Since a quality camera should have sufficient back focal length in its optical system, these cameras employ a standard lens having its principal point in the rear face of the last lens. Alternatively, high quality cameras employ a retro focus-type lens having its most important lens located near the rear face of the last lens.

Conventional gauss-type standard lens are disclosed in Japanese Patent Application Publication Nos. 86-55089, 86-60414 and 84-25204.

In contrast, when a spherical lens or an aspherical lens of a rotating symmetrical-type is employed in an optical system, problems such as, a scaled-down image having the same horizontal and vertical magnifications, arise. For example, as illustrated in FIG. 5(a), when a regular square is photographed in an optical system using a spherical lens or an aspherical lens of the rotating symmetrical-type, an image having a scaled-down shape the same as the regular square is formed since the horizontal and vertical magnifications are the same.

SUMMARY OF THE INVENTION

The present invention has been made in an effort to solve the above-mentioned problems. It is an object of the present invention to provide a photographic lens system capable of forming a photograph having a variable magnification according to the user's need, by forming a scaled-down image having different horizontal and vertical magnifications.

Additional objects and advantages of the present invention will be set forth in part in the description which follows, and in part will be obvious from the description, or may be learned by practice of the invention. The objects and advantages of the invention are particularly pointed out in the appended claims.

To achieve the above object in accordance with the purpose of the invention, as embodied and broadly described herein, the present invention comprises a photographic lens system, having, from an object side, a first lens group having an overall positive refractive power; and a second lens group having an overall positive refractive power, wherein the first and second lens groups both comprise at least one cylindrical lens and the photographic lens system satisfies the condition of $1.0 < f_1/f_2 < 1.2$ or $0.83 < f_1/f_2 < 1.0$, where $f_1$ represents a focal length in the Y direction and $f_2$ represents a focal length in the Z direction.

Furthermore, the first lens group comprises, from the object side, a first lens having a positive refractive power and a convex-shaped object surface, a second lens having a positive refractive power and a convex-shaped object surface, a third lens having a negative refractive power and a convex-shaped object surface, and a fourth lens comprising a cylindrical lens having a positive or a negative refractive power. Also, the second lens group comprises a fifth lens of a cylinderical lens having an opposite refractive power in respect to a refractive power of the fourth lens, a sixth lens unit comprising at least one lens having a negative refractive power and a concave-shaped object surface, and a seventh lens having one of a positive or a negative refractive power.

The photographic lens system of the present invention further satisfies the condition of $1.21 < L_t/B_f < 1.37$, where $L_t$ represents the thickness from the objective surface of the first lens to an image surface of the seventh lens, and $B_f$ represents the back focal length in the lens system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention, and, together with the description, serve to explain the principles of the invention. In the drawings:

FIG. 5(a) illustrates the results of an image magnification when using a conventional photographic lens system.

FIG. 5(b) illustrates the results of an image magnification when using the photographic lens system shown in FIGS. 1 and 2.

DESCRIPTION OF THE PREFERRED EMBODIMENT

Reference will now be made in detail to the preferred embodiment of the present invention, an example of which is illustrated in the accompanying drawings. Wherever possible, the same reference numbers will be used throughout the drawings to refer to the same or like parts.

Figure 1:
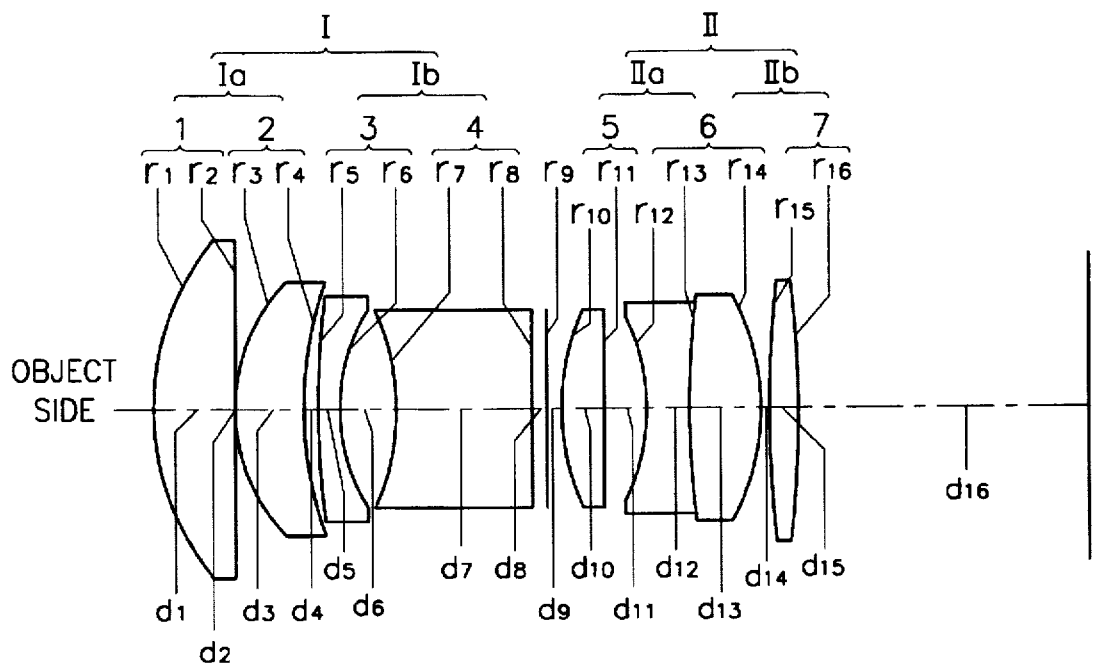
FIG. 1 illustrates the photographic lens system of the present invention in the Y direction.
Figure 2:
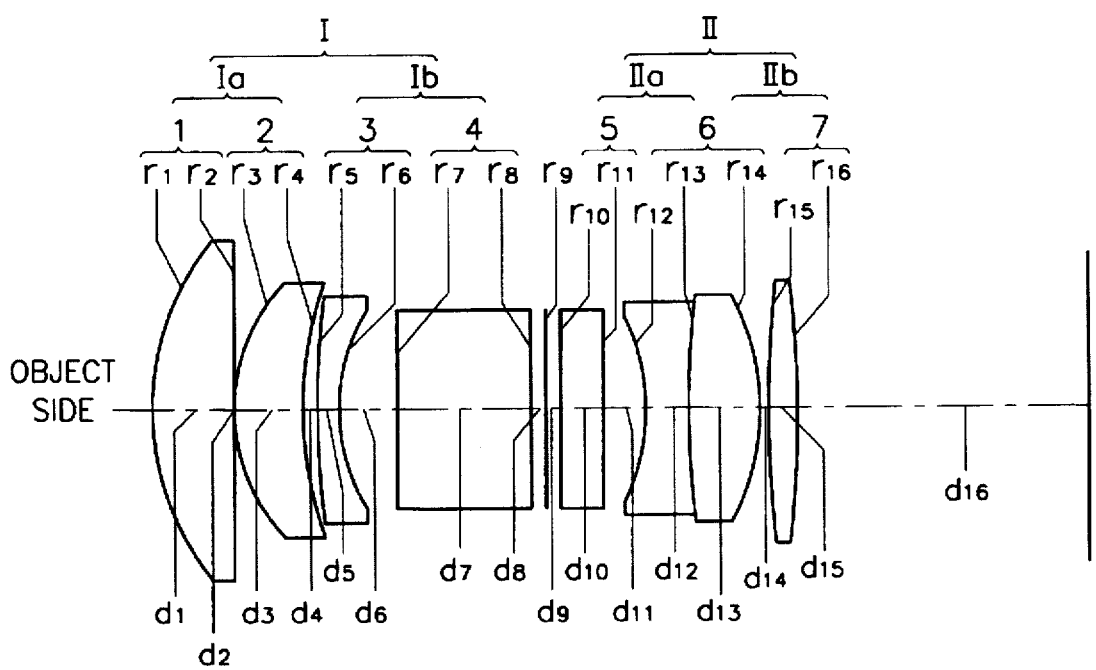
FIG. 2 illustrates the photographic lens system of the present invention in the Z direction.
Figure 3A:
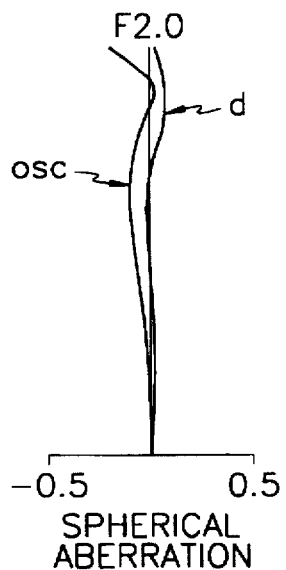
FIGS. 3(a)–3(c) illustrate the lens aberration, astigmatism, and distortion in the Y direction of the photographic lens system shown in FIGS. 1 and 2.
Figure 3B:
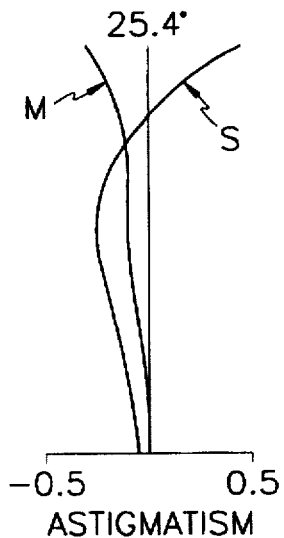
Figure 3C:
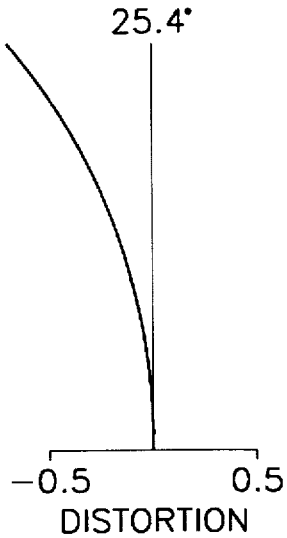
Figure 4A:
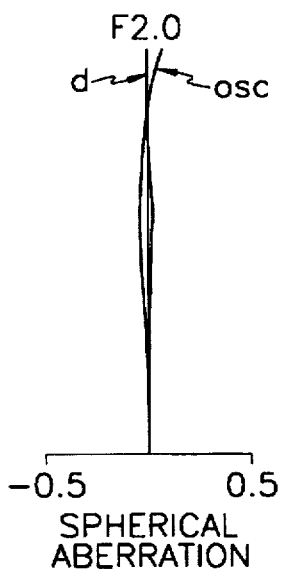
FIGS. 4(a)–4(c) illustrate the lens aberration, astigmatism, and distortion in the Z direction of the photographic lens system shown in FIGS. 1 and 2.
Figure 4B:
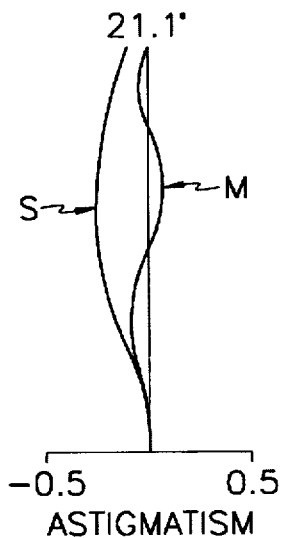
Figure 4C:
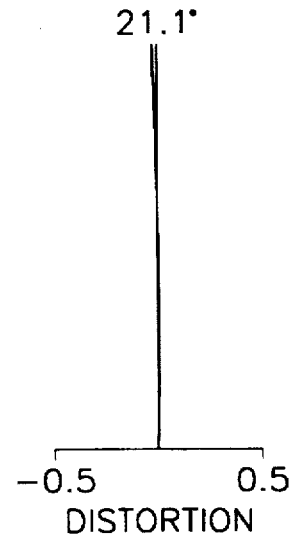

Referring to FIGS. 1 and 2, a photographic lens system in accordance with a preferred embodiment of the present invention comprises, starting from an object side, a first lens group I and a second lens group II. First lens group I comprises a first lens 1 having a positive refractive power; a second lens 2 having a positive refractive power; a third lens 3 having a negative refractive power; and a fourth lens 4 of a cylindrical-type and having a negative refractive power.

Second lens group II comprises a fifth lens 5 of a cylindrical lens having a positive refractive power; a sixth lens unit 6 comprising at least one lens having a negative refractive power; and a seventh lens 7 having one of a positive refractive power.

First lens 1 has a convex-shaped objective surface with a curvature radius r1 and an image surface with a curvature radius r2. Second lens 2 has a convex-shaped objective surface with a curvature radius r3 and an image surface with a curvature radius r4. Third lens 3 has a slightly convex-shaped objective surface with a curvature radius r5 and a concave-shaped image surface with a curvature radius r6. Fourth lens 4 has an objective surface with a curvature radius r7 and an image surface with a curvature radius r8. Fifth lens of cylindrical lens 5 has a convex-shaped objective surface with a curvature radius r10 and an image surface with a curvature radius r11.

Sixth lens 6 unit comprises a lens having a concave-shaped objective surface with a curvature radius r12 and a slightly concave-shaped image surface with a curvature radius r13, and a lens having an objective surface which is cemented to the image surface having a curvature radius r13 and a convex-shaped image surface with a curvature radius r14. Finally, seventh lens 7 has a convex-shaped objective surface with a curvature radius r15 and a convex-shaped image surface with a curvature radius r16.

In the preferred embodiment only sixth lens unit 6 has more than one lens and the remaining lenses have only a single lens. Fifth lens 5 may also have more than one lens. However, the present invention is not limited to this composition. As long as lenses 1–7, in combination satisfy the special characteristics set forth below, any or all of the lenses 1–7 can comprise a lens unit having more than one lens.

According to the preferred embodiment of the present invention, an image can be formed having different horizontal and vertical magnifications. Alternatively, the back focal lengths in the Y and Z directions may be equated while the focal point length of the vertical direction (Z direction) is different from that of vertical direction (Y direction). In such a case, the photographic lens system further comprises at least one cylindrical lens having no refractive power in the Z direction and a positive refractive power in the Y direction, and at least one cylindrical lens having no refractive power in the Z direction and a negative refractive power in the Y direction.

In order to correct the aberration for an image, first lens group I comprises two meniscus lenses, each having a convex-shaped objective surface and a positive refractive power, and one meniscus lens having a negative refractive power. Further, second lens group II comprises two biconvex lenses, each having a positive refractive power, and one biconcave lens having a negative refractive power.

The following is a list of the conditions for the photographic lens system of the preferred embodiment of the present invention:

$$1.0 < f_1/f_2 < 1.2 \quad (1)$$

$$0.83 < f_1/f_2 < 1.0 \quad (2)$$

$$1.21 < L_f/B_f < 1.37 \quad (3)$$

where, $f_1$ is the focal point length in the Y direction, $f_2$ is the focal point length in the Z direction, $L_f$ is the thickness from the surface of first lens 1 to the surface of seventh lens 7, and $B_f$ is the back focal length in the lens system.

Condition (1) relates to the horizontal and vertical magnifications of the image. If the upper limit value of condition (1) is exceeded, it becomes more difficult to equate the focal length in the Y and Z directions due to the large difference between the focal lengths in the Y and Z directions. It also becomes more difficult to obtain a clear image due to increased aberration.

Condition (2) relates to the magnification results, wherein a horizontal magnification is made larger than a vertical magnification by rotating the entire lens system by 90°.

Condition (3) relates to the total length and the back point length of the lens system. If the upper limit value of condition (3) is exceeded, the back focal length becomes very short. As a result, the lens system can not be used in a high quality camera. Also, the lens system becomes very thick and the distance between lenses is elongated. As a result, the entire length of the lens system is lengthened and the lens system weight increases.

On the other hand, if the lower limit value of condition (3) is exceeded, the distance between the lenses is shortened and the lens system becomes very thin. As a result, aberration is increased and realization of a compact camera is impossible since the distance increases between first lens 1 and the image surface due to the elongated back focal length.

According to the preferred embodiment of the present invention, in order to precisely correct every aberration, a rotating symmetrical aspherical lens is used for both first lens 1 and second lens 2.

The coefficient of the aspherical surface of the lens system that meets the above-mentioned conditions (1)–(3) is given by the following equation:

$$X = \frac{Cy^2}{1 + \{1 - (K+1)C^2y^2\}^{1/2}} + A_4 y^4 + A_6 y^6 + A_8 y^8 + A_{10} y^{10}$$

where, X is an optical axial distance from the lens vertex, y is a vertical distance of the optical axis, C is a reciprocal of the radius of curvature, K is a conic number, and $A_4$, $A_6$, $A_8$, and $A_{10}$ are aspherical coefficients. Values which satisfy the above-mentioned conditions are described below.

In Table 1, a radius of curvature of a refractive surface is represented by ri (i=1–16), a lens thickness or a distance between lenses is represented by di (i=1–16), d-line refractive indices of a lens are represented b nd, an Abbe number of a lens is represented by v, a magnification of an overall optical system is represented by m, and a half viewing angle is represented by ω.

In Table 1, half viewing angle ω in the Y direction is 50.42°, focal point length f in the Y direction is 49.592 mm, and aperture value F in the Y direction is 2.0. Furthermore, half viewing angle ω in the Z direction is 42.26°, focal point length f in the Z direction is 56.550 mm, and aperture value F in the Z direction is 2.0.

TABLE 1

| Surface number | Rad. of curvature (r) | Thickness (d) | Refractive Index (nd) | Abbe number (v) |
|---|---|---|---|---|
| 1 | 33.875 | 5.66 | 1.63854 | 55.45 |
| 2 | ∞ | 0.10 | | |
| 3 | 24.701 | 5.13 | 1.72342 | 37.99 |
| 4 | 49.004 | 1.05 | | |
| 5 | 206.902 | 0.80 | 1.69895 | 30.05 |
| 6 | 18.344 | 3.83 | | |
| 7 | R7 | 10.00 | 1.48749 | 70.44 |
| 8 | ∞ | 1.00 | | |
| 9 | aperture | 1.00 | | |
| 10 | R10 | 2.87 | 1.48749 | 70.44 |
| 11 | ∞ | 3.5 | | |
| 12 | −21.665 | 2.88 | 1.74077 | 27.76 |
| 13 | 188.959 | 5.16 | 1.78590 | 43.73 |
| 14 | −25.592 | 0.30 | | |
| 15 | 88.531 | 2.13 | 1.80610 | 40.73 |
| 16 | −142.185 | BF | | |

In the preferred embodiment of the present invention, the distance between the lenses, and the thickness and coefficient of the aspherical surface vary according to a view angle, as shown in tables 2 and 3.

TABLE 2

|  | Y direction (ω = 50.42°) | z direction (ω = 42.26°) |
|---|---|---|
| r7 | −33.327 | ∞ |
| K | 0.52751711E −2 | 0 |
| A4 | 0.35637360E −4 | 0 |
| A6 | −0.35902128E −6 | 0 |
| A8 | 0.47630387E −8 | 0 |
| A10 | −0.25231791E −10 | 0 |
| r10 | 30.417 | ∞ |
| K | −0.65898902E −2 | 0 |
| A4 | −0.36182355E −4 | 0 |
| A6 | 0.59166200E −6 | 0 |
| A8 | −0.86657170E −8 | 0 |
| A10 | 0.44229085E −10 | 0 |
| BF | 35.000 mm | 35.000 mm |

TABLE 3

|  | An Aspherical Coefficient of the Third Surface | An Aspherical Coefficient of the 15th Surface |
|---|---|---|
| K | 0.80752401 | 0.27023844 |
| A4 | −0.58878742E −5 | 0.35721352E −5 |
| A6 | −0.21706187E −7 | −0.21358901E −7 |
| A8 | 0.57193357E −10 | 0.37875808E −9 |
| A10 | −0.36320100E −12 | −0.15121478E −11 |

As described above, the photographic lens system in accordance with the embodiments of the present invention, provides the following benefits. First, it provides a scaled-down image having different horizontal and vertical magnifications so as to obtain a picture having a variable magnification according to a user's need. Second, it provides an image formed at the same position by making the horizontal and vertical magnifications different due to the back focal length in the Y direction being different from that in the Z direction, while equating the focal point lengths in the Y and Z directions. Third, it provides a photographic lens system for use with a high quality camera having a relatively large aperture ratio and a good efficiency when forming an image.

What is claimed is:

1. A photographic lens system, comprising, from an object side:

a first lens group having an overall positive refractive power; and a second lens group having an overall positive refractive power, wherein said first and second lens groups both comprise at least one cylindrical lens and said photographic lens system satisfies the condition of $1.0 < f_1/f_2 < 1.2$, where $f_1$ represents a focal length in the Y direction, and $f_2$ represents a focal length in the Z direction.

2. The photographic lens system according to claim 1, wherein said first lens group, comprises, from an object side:

a first lens having a positive refractive power and a convex-shaped object surface, a second lens having a positive refractive power and a convex-shaped object surface, a third lens having a negative refractive power and a convex-shaped object surface, and a fourth lens comprising a cylindrical lens having a negative refractive power; and said second lens group comprises:

a fifth lens of a cylinderical lens having a positive refractive power, a sixth lens unit comprising at least one lens having a negative refractive power and a concave-shaped object surface, and a seventh lens having one of a positive or a negative refractive power.

3. The photographic lens system according to claim 2, wherein said lens system satisfies the condition of $1.21 < L_t/B_f < 1.37$, where $L_t$ represents the thickness from the objective surface of said first lens to an image surface of said seventh lens, and $B_f$ represents the back focal length in the lens system.

4. The photographic lens system according to claim 2, wherein said first lens and said second lens both comprise at least one aspherical lens.

* * * * *

UNITED STATES PATENT AND TRADEMARK OFFICE
CERTIFICATE OF CORRECTION

PATENT NO. : 5,731,908
DATED : March 24, 1998
INVENTOR(S) : KIM

It is certified that error appears in the above-identified patent and that said Letters Patent is hereby corrected as shown below:

Title Page, Item [75], in the Inventor, line 1, "Moon Hyun" should read --Moon-Hyun--.

Claim 2, column 6, line 26, "of a cylinderical" should read --comprising a cylindrical--.

Signed and Sealed this

Twenty-ninth Day of June, 1999

Attest:

Q. TODD DICKINSON

*Attesting Officer*  *Acting Commissioner of Patents and Trademarks*